United States Patent
Nakai et al.

(10) Patent No.: US 10,557,218 B2
(45) Date of Patent: Feb. 11, 2020

(54) TEXTILE MACHINE BELT

(71) Applicant: NITTA CORPORATION, Osaka-shi, Osaka (JP)

(72) Inventors: Naomichi Nakai, Yamatokoriyama (JP); Toshimitsu Higashi, Yamatokoriyama (JP)

(73) Assignee: NITTA CORPORATION, Osaka-shi, Osaka (JP)

(*) Notice: Subject to any disclaimer, the term of this patent is extended or adjusted under 35 U.S.C. 154(b) by 0 days.

(21) Appl. No.: 15/754,497

(22) PCT Filed: Aug. 23, 2016

(86) PCT No.: PCT/JP2016/074448
§ 371 (c)(1),
(2) Date: Feb. 22, 2018

(87) PCT Pub. No.: WO2017/033907
PCT Pub. Date: Mar. 2, 2017

(65) Prior Publication Data
US 2018/0245247 A1  Aug. 30, 2018

(30) Foreign Application Priority Data
Aug. 25, 2015 (JP) ................. 2015-165839

(51) Int. Cl.
F16G 1/04  (2006.01)
D03D 1/00  (2006.01)
(Continued)

(52) U.S. Cl.
CPC ............ D01H 1/241 (2013.01); B65H 54/70 (2013.01); D03D 1/00 (2013.01); D03D 1/0094 (2013.01);
(Continued)

(58) Field of Classification Search
CPC ........ D01H 1/241; D01H 1/00; D01H 1/0094; D01H 1/0005; B65H 54/70; B65H 2701/31; F16G 1/04; F16G 1/10
(Continued)

(56) References Cited

U.S. PATENT DOCUMENTS 3,296,062 A    1/1967  Truslow
3,851,681 A *  12/1974 Egan ................. D03D 25/00
                                             139/420 R
(Continued)

FOREIGN PATENT DOCUMENTS

EP    0293989 A1   12/1988
EP    1388598 A1    2/2004
(Continued)

OTHER PUBLICATIONS

The extended European search report of the corresponding EP application No. 16839254 dated Apr. 4, 2019.

Primary Examiner — Khoa D Huynh
Assistant Examiner — Grace Huang
(74) Attorney, Agent, or Firm — Muncy, Geissler, Olds & Lowe, P.C.

(57) ABSTRACT

The present invention provides a belt for a textile machine capable of reducing running noise caused during belt running. A canvas core used in the belt is constituted by a woven fabric based on a twill weave texture in which a warp crosses a plurality of wefts and aggregates (19) of weave points at which the warp crosses the wefts are regularly shifted in one longitudinal direction (L) of the belt to form a twill line (17), and some of the aggregates (19) in the twill line (17) are shifted at a predetermined interval in the opposite direction to the one longitudinal direction.

4 Claims, 6 Drawing Sheets

(51) Int. Cl.
  *D03D 13/00* (2006.01)
  *D01H 1/241* (2006.01)
  *B65H 54/70* (2006.01)
  *F16G 1/10* (2006.01)
(52) U.S. Cl.
  CPC ......... *D03D 13/002* (2013.01); *D03D 13/008* (2013.01); *F16G 1/04* (2013.01); *F16G 1/10* (2013.01); *B65H 2701/31* (2013.01)
(58) Field of Classification Search
  USPC .......... 139/383 R, 383 A; 474/205; 442/191, 442/308
  See application file for complete search history.

(56) References Cited

U.S. PATENT DOCUMENTS

| | | | | |
|---|---|---|---|---|
| 3,974,025 A | * | 8/1976 | Ayers | D21F 11/006 162/113 |
| 4,265,627 A | * | 5/1981 | Imamura | F16G 5/08 156/139 |
| 5,052,448 A | * | 10/1991 | Givin | D21F 1/0045 139/383 A |
| 5,324,392 A | * | 6/1994 | Tate | D21F 1/0027 139/383 A |
| 5,713,397 A | * | 2/1998 | Quigley | D21F 1/0036 139/383 A |
| 6,978,809 B2 | * | 12/2005 | Quigley | D21F 1/0045 139/383 A |
| 7,357,156 B2 | * | 4/2008 | Ueda | D21F 1/0036 139/383 A |
| 7,980,275 B2 | * | 7/2011 | Gstrein | D21F 1/0036 139/383 A |
| 10,190,239 B2 | * | 1/2019 | Bischoff | B29C 70/22 |
| 2004/0121869 A1 | * | 6/2004 | Becella | B29C 70/22 474/267 |

FOREIGN PATENT DOCUMENTS

| | | |
|---|---|---|
| EP | 1724382 A1 | 11/2006 |
| JP | S50-125519 U | 10/1975 |
| JP | S54-16176 Y2 | 6/1979 |
| JP | 2005-226181 A | 8/2005 |
| JP | 2007-314895 A | 12/2007 |
| JP | 2011-058113 A | 3/2011 |
| JP | 2013-213576 A | 10/2013 |

* cited by examiner

TEXTILE MACHINE BELT

TECHNICAL FIELD

The present invention relates to a belt for a textile machine.

BACKGROUND ART

Belts used in textile machines usually have a rubber layer on the surface thereof (e.g., see Patent Literature 1.). The rubber layer on the surface of such a belt is responsible for the abrasion resistance and bending resistance of the belt.

In a doubling and twisting machine as a textile machine, a pair of belts is disposed to cross each other and is each allowed to run across to each other by a pulley. The pair of belts then each nips a yarn by means of a face opposing to each other to thereby produce a twisted yarn. Meanwhile, in a covering machine as a textile machine, a hollow spindle supporting a spinning bobbin is rotated at a high speed, and a covering yarn supplied from the spinning bobbin is wound onto a core yarn running through this hollow spindle to thereby produce a covered yarn. In the covering machine, a belt disposed in contact with the hollow spindle allows the hollow spindle to rotate at a high speed.

CITATION LIST

Patent Literature

Patent Literature 1 Japanese Patent Laid-Open No. 2007-314895

SUMMARY OF INVENTION

Technical Problem

During operation of a textile machine, running noise in a relatively high sound range may occur from a portion of a belt in contact with a pulley. Frequencies from 6000 to 8000 Hz have been confirmed in the running noise. Even when the sound pressure level is not extremely high, frequencies from 6000 to 8000 Hz are considered to be in a range of frequencies that generally result in uncomfortableness. To maintain a satisfactory working environment, uncomfortable running noise during operation of a textile machine is required to be reduced.

It is thus an object of the present invention to provide a belt for a textile machine capable of reducing running noise that occurs during belt running.

Solution to Problem

The belt for a textile machine according to the present invention is a belt including a canvas core. The canvas core is constituted by a woven fabric based on a twill weave texture in which a warp crosses a plurality of wefts and aggregates of weave points at which the warp crosses the wefts are regularly shifted in one longitudinal direction of the belt to form a twill line. The twill line includes some of the aggregates shifted at a predetermined interval in the opposite direction to the one longitudinal direction.

Advantageous Effects of Invention

According to the present invention, in the twill line, some of the aggregates are shifted at a predetermined interval in the opposite direction to the one longitudinal direction of the belt. The canvas core has thus suppressed in surface undulations in the width direction of the belt so that the influence on the surface properties of the belt can be suppressed even after use over a long period. The belt for a textile machine thus can reduce running noise caused during its running.

DESCRIPTION OF EMBODIMENT

An embodiment of the present invention will be described in detail hereinbelow with reference to the drawings.

1. Overall Structure

Figure 1:
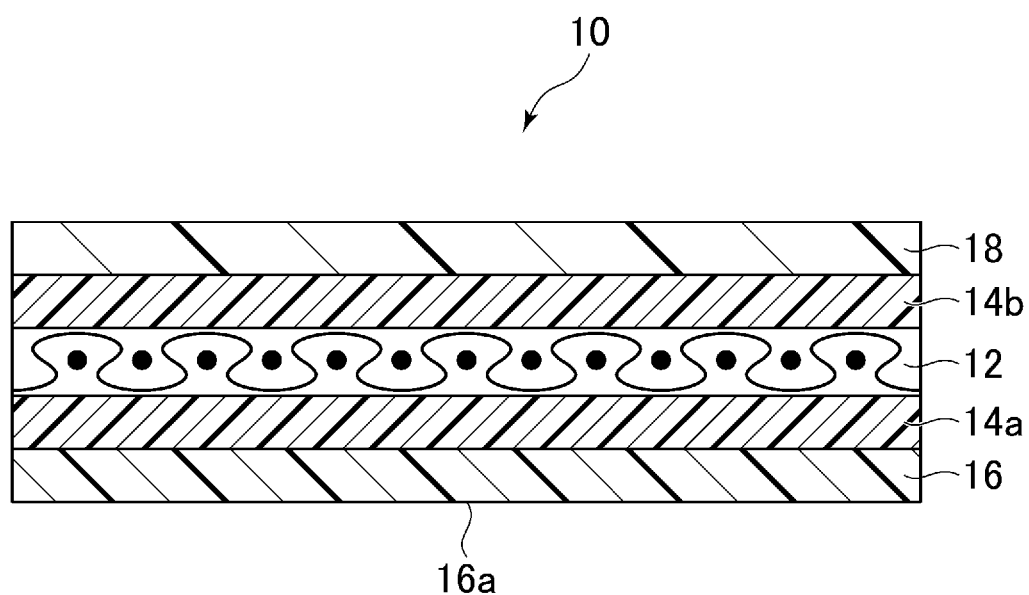
FIG. 1 is a cross-sectional view of a belt for a textile machine according to the present embodiment.

A belt for a textile machine (a textile machine belt) 10 shown in FIG. 1 includes a canvas core 12, a first resin layer 14a and a second resin layer 14b each provided on each face of the canvas core 12, a pulley-side layer 16 provided on the front face of the first resin layer 14a, and a spindle-side layer 18 provided on the front face of second resin layer 14b.

<Canvas Core>

The material of the canvas core 12 may be selected from polyester fibers, nylon fibers, and the like. Examples of the polyester fiber include polyethylene terephthalate (PET) fibers and polybutylene terephthalate fibers, and examples of the nylon fiber include nylon-6 fibers and nylon-66 fibers. In particular, PET fibers are preferred as the material of the canvas core 12. The thickness of the canvas core 12 is not particularly limited, and is usually preferably about 0.4 to 1.2 mm, more preferably about 0.45 to 0.8 mm.

Figure 2A:
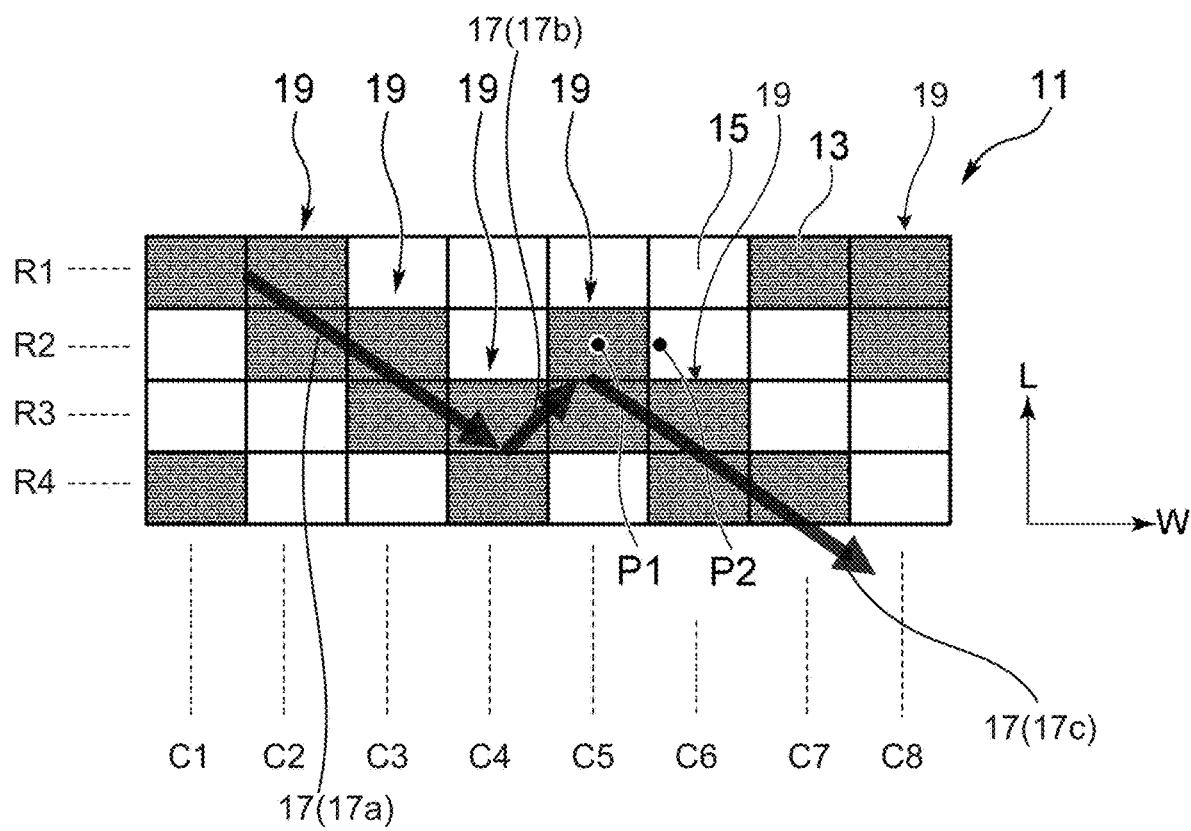
FIG. 2A is a schematic view showing the front face of a minimum unit of a twill weave texture of a canvas core according to the present embodiment.

The canvas core 12 features a front face and a back face that are more flattened than those of a conventional one. The structure of the canvas core 12 will be described in detail with reference to FIG. 2A and FIG. 2B. A minimum unit 11 of a twill weave texture of the canvas core 12 is shown in FIG. 2A. The minimum unit 11 is constituted by four squares down and eight squares across. Each square is a weave point, at which a warp crosses a weft. Each column represents a warp, and each row represents a weft. Each black solid square is a first weave point 13, at which a warp crosses a weft by passing over the weft. Each hollow square is a second weave point 15, at which a warp crosses a weft by passing under the weft.

Figure 2B:
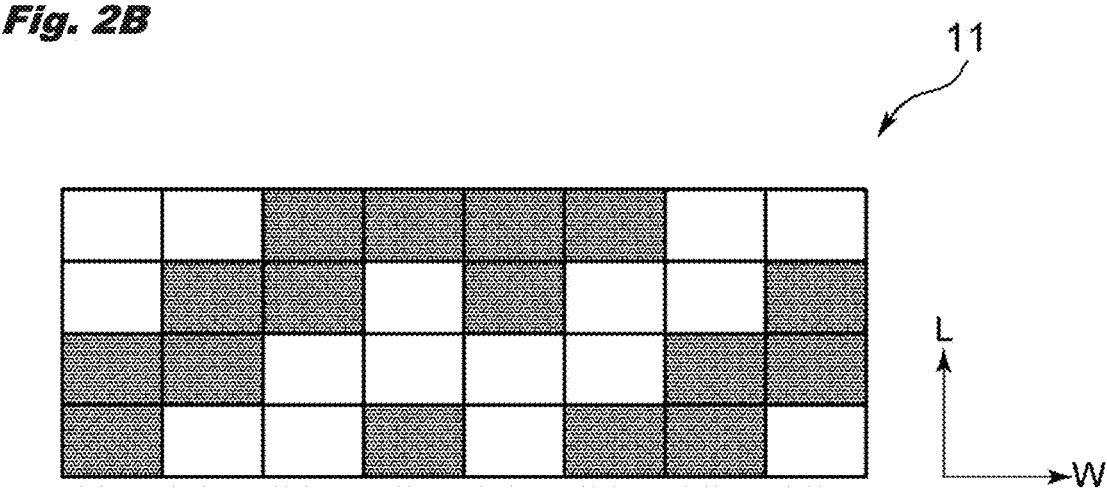
FIG. 2B is a schematic view showing the back face of a minimum unit of the twill weave texture of a canvas core according to the present embodiment.

In the minimum unit 11 of the twill weave texture shown in FIG. 2A, the vertical direction is the longitudinal direction L of the belt, and the horizontal direction is the width direction W of the belt. The back face of the minimum unit 11 of the twill weave texture shown in FIG. 2B shows a state in which the front face (FIG. 2A) is turned over horizontally. On the back face, the first weave points 13 and the second weave points 15 appear oppositely to the case of the front face. The canvas core 12 has a twill weave texture on one side different from that on the other side. That is, in the canvas core 12, the same minimum unit 11 will not appear on the front face (FIG. 2A) and the back face (FIG. 2B).

The canvas core 12 is a woven fabric based on a twill weave texture in which a warp crosses a plurality of wefts and aggregates 19 of the first weave points 13, as weave points at which the warp crosses the wefts, are regularly shifted in one longitudinal direction (L) of the belt to form a twill line 17. In the present embodiment, the numbers of floats of the warp and floats of the weft, that is, the number of first weave points 13 and the number of second weave points 15 are the same, that is, two. In consideration of one column, a warp repeatedly passes over two wefts and then passes under two wefts. Accordingly, in one column, two first weave points 13 and two second weave points appear repeatedly. The aggregates 19 herein are each formed by two first weave points 13.

FIG. 2A illustrates a unit of the woven fabric that is composed with 4 rows (R1-R4)×8 columns (C1-C8). The unit is made with 32 points. The twill line 17, which is formed by connecting the aggregates 19 that are adjacent one another, is shown with arrow 17 (specifically, three arrows 17a-17c). From column C2 to column C4, twill line 17a goes to one row down as it moves to the next column. From column C4 to column C5, twill line 17b goes to one row up. From column C5 to column C7, twill line 17c goes to one row down as it moves to the next column.

In the unit, the aggregates 19 all are composed two first weave points 13, which alignes in the vertical direction. Further, as described above, in this embodiment, the number of the first weave points and the number of the second weave points in one column are the same. For example, at column C2, two first weave points 13 (or hatched boxes) are arranged at rows R1 and R2. Two second weave points 15 (or blank boxes) are arranged at rows R3 and R4. At column C4, two first weave points are arranged at rows R3 and R4, and two first weave points 13 are arranged at rows R1 and R2.

The aggregates 19 are regularly shifted in one longitudinal direction L of the belt and some of the aggregates 19 are shifted at a predetermined interval in the opposite direction to the one longitudinal direction L of the belt to thereby form the twill line 17. Some of the first weave points 13 in adjacent columns are connected to one another to allow the aggregates 19 to be entirely continuous.

In the present embodiment, the aggregates 19 are shifted one square downward in the vertical direction as the aggregates go to the column on the right side. For example, with respect to the aggregate 19 in the second column from the left, the aggregate 19 in the column on the right side (the third column from the left) is shifted one square downward in the vertical direction, and thus is connected to the aggregate 19 in the second column at the upper first weave point 13. Likewise, the aggregate 19 in the fourth column from the left is shifted one square downward in the vertical direction with respect to the aggregate 19 in the third column from the left.

Additionally, in the fifth column from the left, the aggregate 19 is shifted one square upward in the vertical direction. This shift connects the aggregate 19 in the fifth column from the left to the aggregate 19 in the fourth column from the left at the lower first weave point 13. Then, the aggregate 19 in the sixth column from the left is shifted one square downward in the vertical direction with respect to the aggregate 19 in the fifth column from the left. In this manner, in the canvas core 12, some of the aggregates 19 are shifted one square upward in the vertical direction at a predetermined interval (every fifth column in FIG. 2A). This shift allows the twill line 17 to have a more gradual slope with respect to the width direction W of the belt compared with the case in which a twill line is formed only by aggregates 19 regularly shifted in one longitudinal direction L of the belt.

The twill line 17 formed by the aggregates 19 forms an angle of more than 45° with the longitudinal direction L of the belt when the number and density of warps equal to the number and density of wefts.

As described above, the canvas core 12, which is constituted by woven fabric based on a twill weave texture in which a warp crosses a plurality of wefts, can increase the tensile strength of the belt in the longitudinal direction. In the canvas core 12, the aggregates 19 are each formed with the smallest number of weave points. That is, the canvas core 12 is woven such that two first weave points 13 and two second weave points 15 appear repeatedly in the vertical direction, and thus can suppress undulations of the warps to thereby allow the front face and back face to be more flattened.

In the canvas core 12, the twill lines 17 have a gradual slope with respect to the width direction W of the belt, and thus the number of the twill lines 17 that cross the width direction of the belt is reduced. Then, the canvas core 12 can suppress undulations of the surface in the width direction of the belt.

The canvas core 12 can provide a more homogeneous surface because the number of first weave points 13 and the number of second weave points 15 are the same in a minimum unit of the twill weave texture.

In the canvas core 12, the difference in height between the warp at the first weave point 13 and the weft at the second weave point adjacent to the first weave point 13, more specifically, the height difference between P1 and P2 in FIG. 2A, is preferably 80 µm or less. The canvas core 12 like this can be obtained by using a warp having a thickness of 1000 to 1700 decitex and a weft having a thickness of 1000 to 1700 decitex and setting densities to 170 to 200 for the length and 40 to 60 for the width, in addition to employing the twill weave texture as described above. In this case, it is preferred that the warp have a twisting degree of 80 to 170/m and the weft be non-twisted.

<First and Second Resin Layers>

A first resin layer 14a and a second resin layer 14b, which are formed using thermoplastic elastomer, provide the textile machine belt 10 with adhesion and flexibility. Examples of the thermoplastic elastomer include thermoplastic polyurethane (TPU) elastomer and polyester elastomer. Of these, TPU elastomer is preferred because of its much higher flexibility and bendability. The thickness each of the first resin layer 14a and the second resin layer 14b is not particularly limited, and is usually preferably about 0.2 to 0.85 mm, more preferably about 0.5 to 0.85 mm.

<Pulley-Side Layer>

A pulley-side layer 16 on the front face of the first resin layer 14a is brought into contact with pulleys in a textile machine to thereby be subjected to friction. This pulley-side layer 16 can be made using a rubber material selected from natural rubber, isoprene rubber, butadiene rubber, styrene-butadiene rubber, ethylene-propylene rubber, chloroprene rubber, chlorinated polyethylene, epichlorohydrin rubber, nitrile rubber (NBR), acryl rubber, urethane rubber, and the like. One of these rubber materials may be used singly, or two or more of these may be used in combination. As the rubber material, NBR is preferred because NBR can be fixed onto the canvas core 12 by a simple process to thereby provide satisfactory adhesion. The thickness of the pulley-side layer 16 is not particularly limited, and is usually preferably about 0.15 to 0.45 mm, more preferably about 0.2 to 0.3 mm.

The hardness of the pulley-side layer 16 (JIS-A) is preferably 60° to 83° or less, more preferably 70° or less. The hardness of the pulley-side layer 16 can be determined in accordance with JIS K6301.

<Spindle-Side Layer>

A spindle-side layer 18 on the second resin layer 14b is brought into contact with spindles in the textile machine to thereby rotate the spindles. This spindle-side layer 18 can be formed with materials similar to those for the pulley-side layer 16. The thickness of the spindle-side layer 18 is not particularly limited, and is usually preferably about 0.15 to 0.45 mm, more preferably about 0.2 to 0.3 mm.

2. Production Method

The textile machine belt 10 may be produced by any method that allows the canvas core 12 to fix onto the first resin layer 14a and the second resin layer 14b, allows the first resin layer 14a to fix onto the pulley-side layer 16, and allows the second resin layer 14b to fix onto the spindle-side layer 18 without causing peeling-off.

First, an adhesive is applied by coating or dipping onto both the faces of the canvas core 12 formed into a band. As the adhesive, a polyurethane adhesive can be used, for example. Each of the faces of the canvas core 12 onto which the adhesive has been applied is laminated with the first resin layer 14a or the second resin layer 14b by extrusion lamination.

The pulley-side layer 16 can be disposed by applying a predetermined rubber material onto predetermined canvas by calendaring to make a rubber-material sheet and transferring the obtained sheet onto the front face of the first resin layer 14a. In the present embodiment, the canvas used for production of the pulley-side layer 16 has a plain weave texture, and the pitch of this canvas is specified to be less than 0.7 mm.

The spindle-side layer 18 can be disposed by making a rubber-material sheet on canvas in the same manner as for the pulley-side layer 16 and transferring the obtained sheet onto the front face of the second resin layer 14b. When the spindle-side layer 18 is made, the canvas to be used is not particularly limited, and any canvas can be used.

When the pulley-side layer 16 and the spindle-side layer 18 are transferred, a rubber-material sheet is disposed on the front face each of the first resin layer 14a and the second resin layer 14b to obtain a laminate having canvas on the outermost faces. This laminate is processed to have a predetermined thickness by carrying out compression and vulcanization under a heating and pressing condition. The thickness after compression and vulcanization can be about 2.0 to 3.0 mm, for example. Carrying out compression and vulcanization allows the pulley-side layer 16 to fix onto the front face of the first resin layer 14a via vulcanization adhesion and allows the spindle-side layer 18 to fix onto the front face of the second resin layer 14b via vulcanization adhesion.

The canvas on the outermost faces is peeled off to thereby provide the textile machine belt 10 of the present embodiment including the canvas core 12, the first resin layer 14a and the second resin layer 14b each provided on both the faces of the canvas core 12, the pulley-side layer 16 provided on the first resin layer 14a, and the spindle-side layer 18 provided on the second resin layer 14b.

The textile machine belt 10 thus obtained can have a desired dimension depending on the apparatus to be applied. For example, the belt may have a width of about 20 to 60 mm and a length of about 10 to 160 m. The textile machine belt 10 of the present embodiment may be formed into an endless belt by splicing its both ends via a finger joint. The endless belt 10 may be used by being put around between two pulleys on a textile machine at a tension of about 15 to 30 N/mm, for example.

3. Function and Effects

In the textile machine belt 10 according to the present embodiment, aggregates 19 are regularly shifted in one longitudinal direction L of the belt and some of the aggregates 19 are shifted at a predetermined interval in the opposite direction to the one longitudinal direction L of the belt to thereby form the twill line 17. Thus, undulations of the surface in the width direction of the belt can be suppressed. This suppression can reduce the sound pressure level of frequencies from 6000 to 8000 Hz occurring during belt running.

Since the canvas core 12 is woven such that two first weave points 13 and two second weave points 15 appear repeatedly in the vertical direction. Thus, it is possible to increase the tensile strength in the longitudinal direction of the belt as well as to suppress undulations of the front face and back face because the number of the floats is two to thereby to enable the belt to be more flattened. Accordingly, the canvas core 12 can suppress the influence on the surface properties of the belt even when the thickness each of the first resin layer 14a and the second resin layer 14b, the pulley-side layer 16, and the spindle-side layer 18 formed on the canvas core 12 is not large, or even when the thickness each of the first resin layer 14a and the second resin layer 14b, the pulley-side layer 16, and the spindle-side layer 18 becomes thinner after use for a long period. Accordingly, the textile machine belt 10 enables the running noise to remain reduced even after its usable time is expired.

4. Examples

A textile machine belt according to the present invention was actually made and evaluated. First, a canvas core was made in accordance with the specification shown below. As a warp, a polyester filament yarn (1100/1 (decitex/texture), twisting degree: 150±10/m S, Z) was used. As a weft, a polyester filament yarn (1100/1 (decitex/texture), non-twisted) was used. These warp and weft were used to thereby provide a band-like canvas core having a twill weave texture according to the present invention, having a width: 1100 (mm), a length: 210 (m), and a density: warp: 188/50 mm, and weft: 49/50 mm.

Figure 3B:
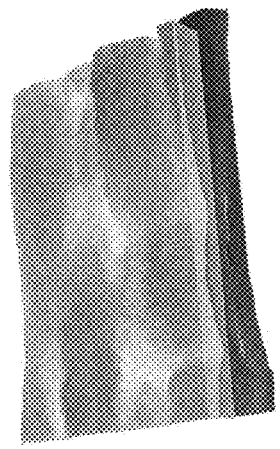
FIG. 3B is a three dimensional image showing the results of measurement of the surface properties of the canvas core according to the present embodiment.
Figure 3A:
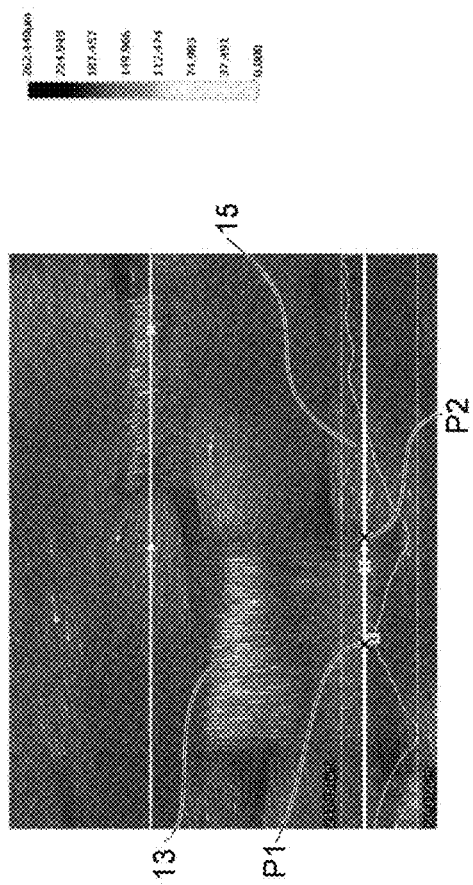
FIG. 3A is an enlarged image showing the results of measurement of the surface properties of the canvas core according to the present embodiment.
Figure 3C:
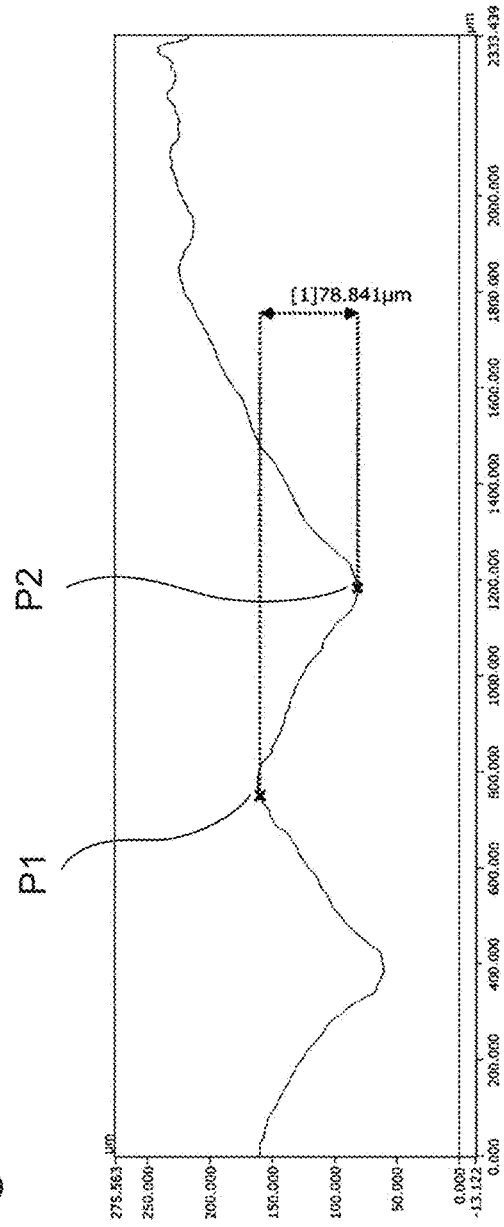
FIG. 3C shows the results of measurement of the height difference of the canvas core according to the present embodiment.

The measurement results of the surface properties of this canvas core are shown in FIG. 3. For the measurement, a digital microscope (manufactured by KEYENCE CORPORATION, model: VHX-5000) was used. FIG. 3A is an enlarged image, FIG. 3B is a three dimensional image, and FIG. 3C shows the results of measurement of the heights of the surface. In FIG. 3C, the abscissa represents a distance from an original point (μm), and the ordinate represents the heights of the surface (μm). In FIG. 3A, a first weave point 13, at which the warp crosses the wefts, appears, and a second weave point 15, at which the weft crosses the warp, appears. In FIG. 3C, the maximum height of the first weave point 13 is denoted with P1 and the minimal height of the second weave point 15 is denoted with P2. Based of the height gap between at P1 and P2, The measurement results were able to confirm that the height difference between the front face of the warp P1 at the first weave point 13 and the front face of the weft P2 at the second weave point 15 adjacent to the first weave point 13 was 78.841 μm. In this case, the front face of the weft P2 at the second weave point 15 was the highest at the position located on the outer edge of the first weave point 13.

Figure 4:
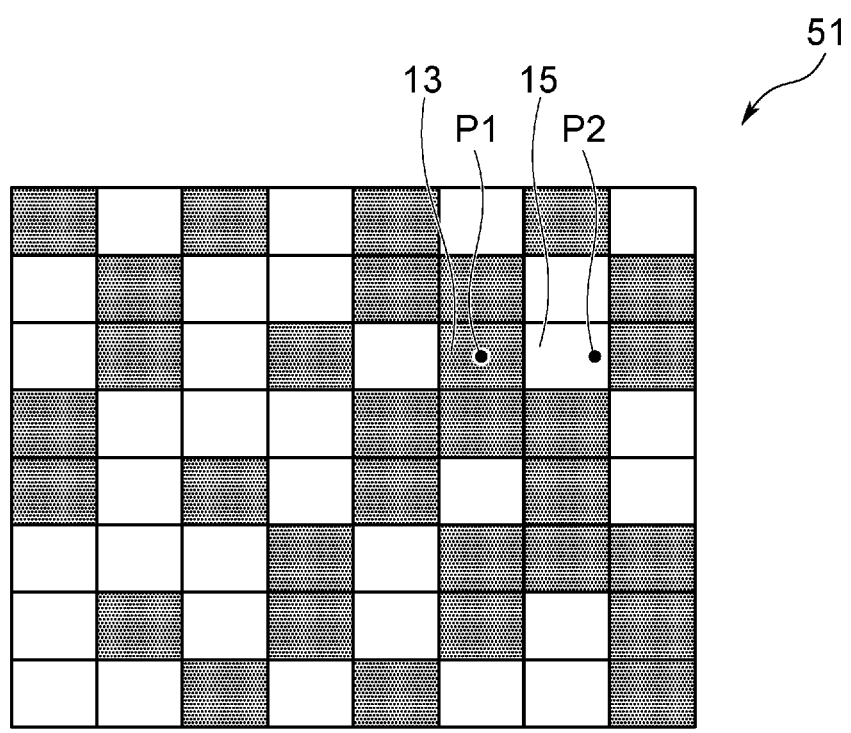
FIG. 4 is a schematic view showing a minimum unit of a twill weave texture of a conventional canvas core.
Figure 5B:
FIG. 5B is a three dimensional image showing the results of measurement of the surface properties of the conventional canvas core.
Figure 5A:
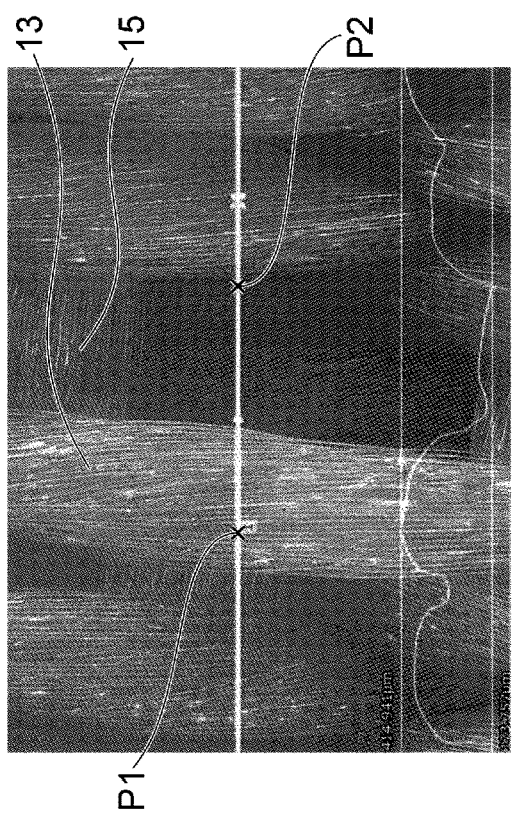
FIG. 5A is an enlarged image showing the results of measurement of the surface properties of the conventional canvas core.
Figure 5C:
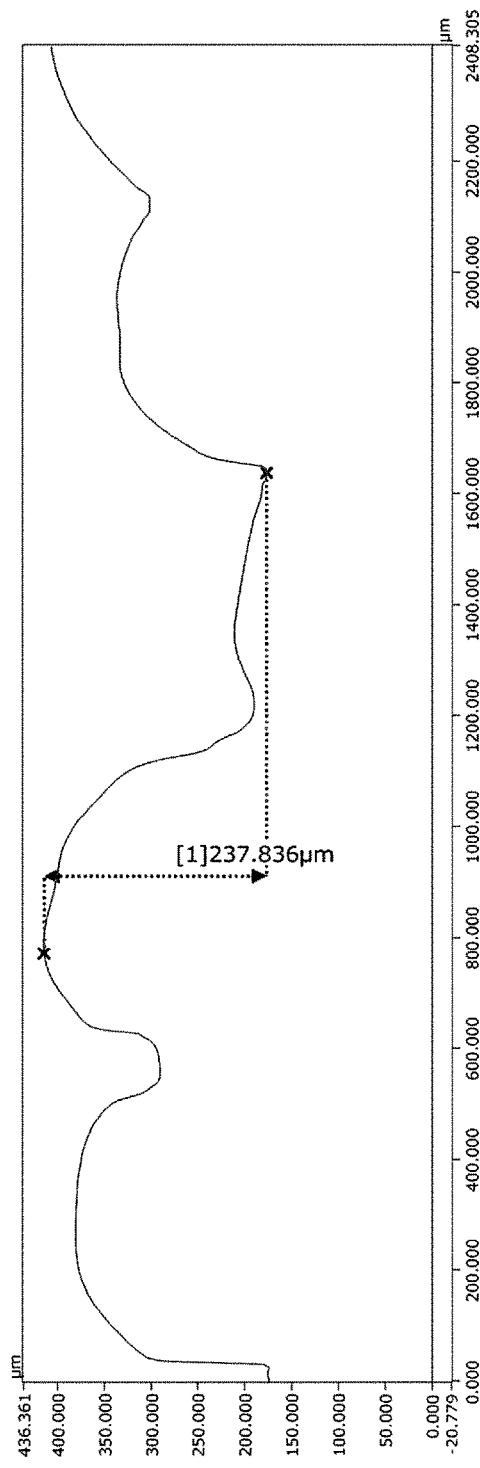
FIG. 5C shows the results of measurement of the height difference of the conventional canvas core.

As a comparison, a conventional canvas core was produced in the same manner as for the canvas core according to the present invention except that the twisting degree of the warp was 150±10/m S, Z and the twill weave texture shown in FIG. 4 was used as the texture for a minimum unit 51. The measurement results of the surface properties of the conventional canvas core are shown in FIG. 5. FIG. 5A is an enlarged image, FIG. 5B is a three dimensional image, and FIG. 5C shows the results of measurement of the height difference. From the measurement results, the conventional canvas core has a height difference between the front face of the warp P1 at the first weave point 13 and the front face of the weft P2 at the second weave point 15 adjacent to the first weave point 13 of 237.836 μm. In this case, the front face of the weft P2 at the second weave point was the lowest at the position located on the outer edge of the first weave point opposed to the first weave point 13.

This was able to confirm that the canvas core according to the present invention has suppressed undulations of the surface and is flattened in comparison with the conventional canvas core.

Subsequently, a polyurethane adhesive was applied by coating onto both the faces of the canvas core formed into a band. Each of the faces of the canvas core onto which the adhesive has been applied was laminated with TPU elastomer by extrusion lamination to make a first resin layer and a second resin layer each having a thickness of 0.8 mm.

NBR as a rubber material was applied at a thickness of 0.25 mm by calendaring onto canvas (manufactured by Asahi Kasei Fibers Corp., part number: 40d taffeta) to thereby provide a rubber-material sheet supported by the canvas, which was the raw material of a pulley-side layer. The canvas used has a pitch of 0.22 mm. A rubber-material sheet to be the raw material of a spindle-side layer was obtained in the same manner.

On the front faces of the canvas core, the raw material of the pulley-side layer was disposed on the first resin layer formed and the raw material of the spindle-side layer was disposed on the second resin layer to thereby provide a laminate having canvas on both the front faces. After this laminate was subjected to compression and vulcanization by a routine method, the canvas on the outermost faces was peeled off to thereby provide a textile machine belt according to Example, having a thickness of 2.6 mm. Likewise, the conventional canvas core was used to provide a textile machine belt according to Comparative Example.

<Measurement of Belt Running Noise>

Figure 6:
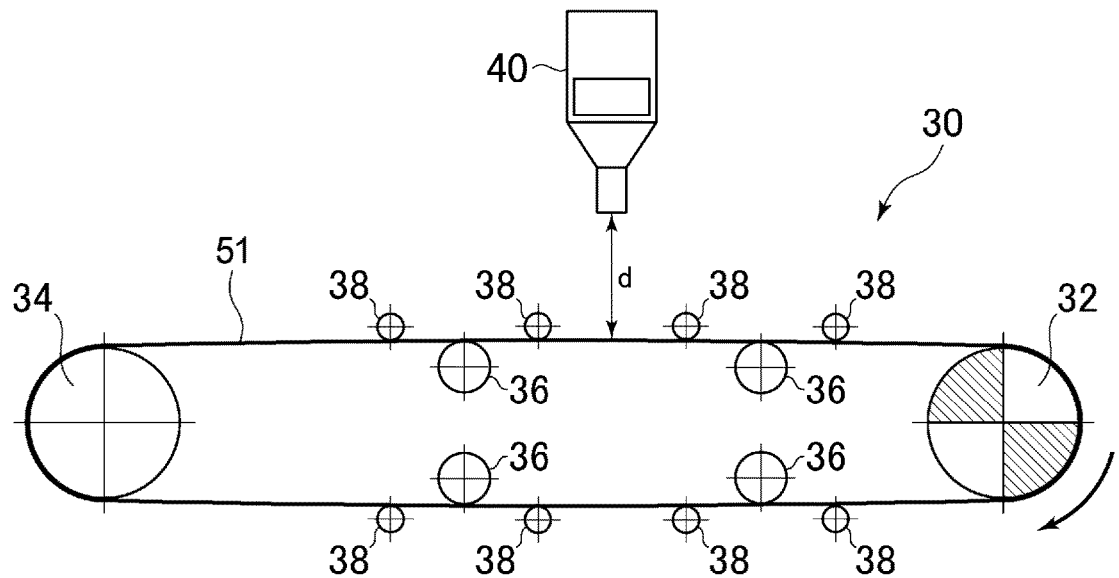
FIG. 6 is a schematic view illustrating a tester for measuring belt running noise.

Both the ends of each of the textile machine belts of Example and Comparative Example were bonded by thermal fusion to make an endless belt having a finger joint. The obtained endless belt was allowed to run on a tester (an in-house mini tangential demonstration machine) 30 shown in FIG. 6 to measure the running noise.

On testing, the endless belt 51 made was put around between a driving pulley 32 and a driven pulley 34, as shown in the figure. The endless belt 51 in this case has a tension of 9 N/mm. Between the driving pulley 32 and the driven pulley 34, a plurality of backup pulleys 36 and spindles 38 are disposed. The diameter of the driving pulley 32 and the driven pulley 34 was 120 mm, the diameter of the backup pulleys 36 was 40 mm, and the diameter of the spindles 38 was 20 mm. In the endless belt 51, the front face of the pulley-side layer 16 is in contact with the pulleys such as backup pulleys 36, and the front face of the spindle-side layer 18 is in contact with the spindles 38. When the endless belt 51 is allowed to run, the front face of the pulley-side layer 16 of the endless belt 51 is pressed by the backup pulleys 36.

The endless belt 51 was allowed to run at a belt speed of 2.5 m/s by rotating the driving pulley 32 in the arrow direction in the figure. The running noise occurring in this case was measured. The running noise was measured with a sound level meter 40 (manufactured by RION Co., Ltd., part number: NA-60), and frequency analysis was carried out with a ⅓ octave band filter, not shown (manufactured by RION Co., Ltd., part number: NX-02A). The distance d between the endless belt 31 and the sound level meter 40 was 150 mm.

Figure 7:
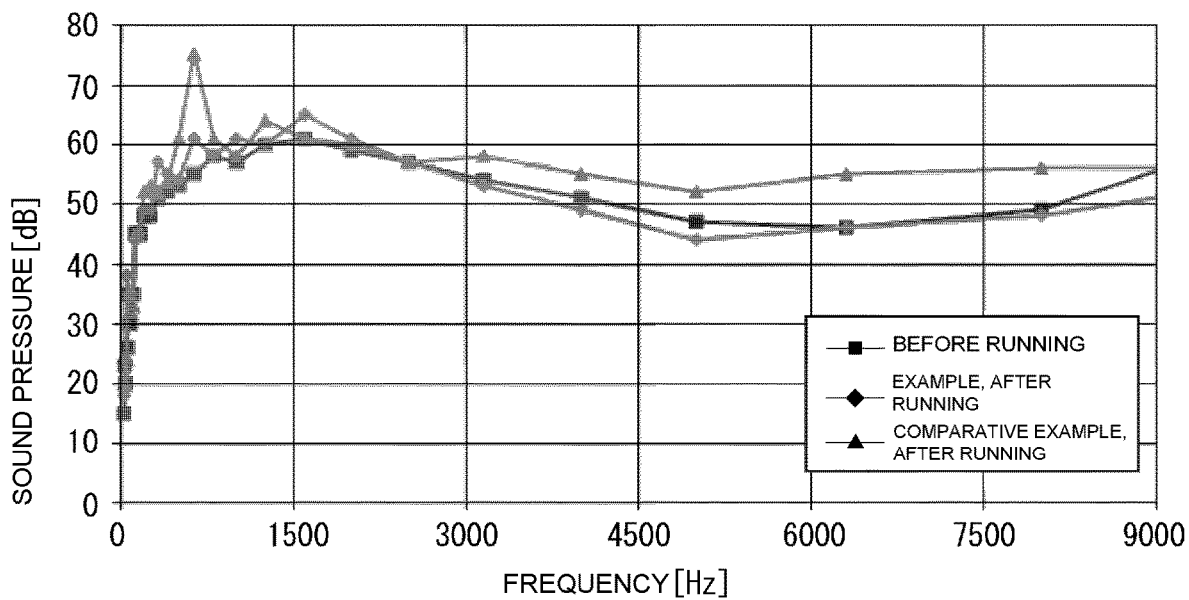
FIG. 7 is a graph showing the results of measurement of the belt running noise.

The results of measurement of the running noise on each of the endless belts of Example and Comparative Example are shown in FIG. 7. In FIG. 7, the abscissa represents the frequency [Hz], and the ordinate represents the sound pressure [dB]. The sound pressure (dB) at a frequency of 6300 Hz of each of the endless belts of Example and Comparative Example is shown in Table 1.

TABLE 1

|  | Immediately after the start of running | | After 10000 hours of running | |
| --- | --- | --- | --- | --- |
|  | Sound pressure (dB) | Belt thickness (mm) | Sound pressure (dB) | Belt thickness (mm) |
| Example | 46 | 2.6 | 46 | 2.3 |
| Comparative Example | 46 | 2.6 | 55 | 2.3 |

As shown in Table 1, the sound pressure at a frequency of 6300 Hz of the endless belt of Example after about 10000 hours of running is lower than that of Comparative Example. Frequencies from 6000 to 8000 Hz are in a range of frequencies that generally result in uncomfortableness. It can be seen that the sound pressure level of the frequencies that result in uncomfortableness is reduced even after 10000 hours of running with the endless belt of Example.

In the endless belt of Example, the canvas core is more flattened than that of Comparative Example, and the height difference between the warp and weft on the outer edge of the first weave point is 78.841 μm. From this, the endless belt according to Example, in which the canvas core slightly influences the surface properties of the belt even when the front face resin layer, the pulley-side layer, or the spindle-side layer becomes thinner, can reduce the sound pressure level at a frequency of 6300 Hz after 10000 hours of running, compared with that of Comparative Example.

Meanwhile, the endless belt according to Comparative Example had a height difference between the warp and weft on the outer edge of the first weave point of 237.836 μm, and the canvas core greatly influences the surface properties of the belt when the front face resin layer, the pulley-side layer, or the spindle-side layer becomes thinner. Thus, the sound pressure level at a frequency of 6300 Hz after 10000 hours of running was increased.

5. Modification

The present invention is not limited to the embodiment described herein, and may be modified appropriately within the scope and spirit of the present invention.

When the textile machine belt 10 of the present embodiment is formed into an endless belt, both the ends of the belt may be tapered, the tapered faces may be bonded with an adhesive and spliced via a Skyver joint to each other. As the adhesive, a urethane adhesive can be used, for example.

In the embodiment described above, the case in which the twill line is formed right-downwardly with respect to the width direction of the belt has been described. The present invention is not limited thereto, and the twill line may be formed right-upwardly with respect to the width direction of the belt.

REFERENCE SIGNS LIST 10 textile machine belt
12 canvas core
13 first weave point
14a first resin layer
14b second resin layer
15 second weave point
16 pulley-side layer
16a (pulley-side layer) front face
17 twill line
18 spindle-side layer
19 aggregate

The invention claimed is:

1. A belt for a textile machine comprising a canvas core, the canvas core being constituted by a woven fabric with warps and wefts, which are respectively extending in a longitudinal direction and a width direction of the belt, the woven fabric composed with minimum units (11) of a twill weave texture, which are repeatedly arranged in the longitudinal direction and the width direction,
each of the minimum units (11) being constituted by weave points (13,15) arranged in a vertical direction which is the longitudinal direction of the belt and in a horizontal direction which is the width direction of the belt, each of the weave points (13,15) being a cross point at which a warp of the warps crosses a weft of the wefts,
the weave points (13,15) being constituted by two types of points that are a first weave point (13) at which the warp crosses the weft by passing over the weft and a second weave point (15) at which the warp crosses the weft by passing under the weft, wherein
in the minimum unit (11):
a plurality of columns, each of which is constituted by the weave points (13,15) aligning in the vertical direction, are arranged in the horizontal direction such that one column extending in the vertical direction is parallel to another column next to the one column;
the column includes an aggregate (19) in which one first weave point (13) and another first weave point (13) are arranged adjacent to each other in the vertical direction; and
a twill line (17) of the twill weave texture is formed by connecting these aggregates (19) over the columns such that the twill line (17) runs in the horizontal direction wherein one aggregate of one column is adjacent to another aggregate (19) of another column next to the one column in the horizontal direction, wherein
the twill line (17) is shifted down by one weave point in the vertical direction as the twill line (17) moves to the next column in the horizontal direction,
after the twill line (17) moves over more than two of the columns in the horizontal direction, the twill line is shifted up by one weave point in an opposite direction from the vertical direction.

2. The belt according to claim 1, wherein the aggregate (19) consists of one first weave point (13) and another first weave point (13).

3. The belt according to claim 2, wherein some of the columns further include one second weave point (15) and another second weave point (15) arranged adjacent to each other in the vertical direction.

4. The belt according to claim 1, wherein a difference between a cross-sectional height of the warp at the first weave point (13) and a cross-sectional height of the weft at the second weave point (15) adjacent to the first weave point (15) is 80 μm or less.

* * * * *